United States Patent Office 3,075,932

Patented Jan. 29, 1963

1

3,075,932

PROCESS FOR CURING POLYEPOXIDES WITH POLYAMINO POLYAMIDE COMPOUNDS AND RESULTING PRODUCTS

Geoffrey R. Edwards and Johannes J. Zonsveld, Delft, Netherlands, assignors to Shell Oil Company, a corporation of Delaware No Drawing. Filed Apr. 13, 1959, Ser. No. 805,666
Claims priority, application Netherlands Apr. 15, 1958
11 Claims. (Cl. 260—18)

This invention relates to a process for curing polyepoxides. More particularly, the invention relates to a new process for curing polyepoxides with amino-containing compounds and to the resulting cured products.

Specifically, the invention provides a new process for curing and resinifying polyepoxides, and preferably glycidyl polyethers of polyhydric phenols or polyhydric alcohols, which comprises mixing and reacting the polyepoxide with a compound containing primary and/or secondary amino groups, which compound contains at least three hydrogen atoms attached to amino nitrogen and has a molecular weight of more than 300, and preferably a polyamino polyamide in the presence of a monohydric phenol.

It is known that polyepoxides can be cured with various basic and acidic materials to form hard resinous products. Lower polyamides, such as diethylene triamine, have been used for this application, but such compounds have the drawback of being poisonous and capable of causing great irritation to the skin. In addition, some of the cured products obtained are quite brittle. Moreover, the use of such amines for coating compositions in many cases gives films which show the so-called "blooming" effect.

Acid anhydrides, such as, for example, phthalic anhydride have also been proposed for this application, but the results obtained are also not very satisfactory. It has been found, for example, that when these curing agents are employed the resulting product contains ester groups and such ester groups have an adverse effect on the chemical resistance of the cured resins.

It has also been proposed to use amino amides, such as may be obtained by reacting dimerized acids with aliphatic polyamines. Although in some respects the cured epoxy resins obtained with the aid of these amino amides gives improved results, such as, for example, in regard to flexibility, the use of these curing agents is not satisfactory. In some cases, the low curing rate is regarded as a drawback, while in other cases, the compatibility of the amino amides at normal temperatures is not entirely satisfactory.

It is an object of the invention, therefore, to provide a new method for curing polyepoxides. It is a further object to provide a method for curing polyepoxides with amino containing curing agents. It is a further object to provide a method for curing polyepoxides with amino containing materials that give a fast curing rate. It is a further object to provide a method for curing polyepoxides with amino containing materials that give improved compatibility. It is a further object to provide process for curing polyepoxides which utilizes curing agents which have a low order of toxicity and give coating compositions free of "blooming." It is a further object to provide a method for curing polyepoxides that gives products having excellent chemical resistance and good flexibility. Other objects and advantages of the invention will be apparent from the following detailed description thereof.

It has now been discovered that these and other objects may be accomplished by the process of the invention which comprises mixing and reacting the polyepoxide,

2 which is preferably a glycidyl polyether of a polyhydric phenol or polyhydric alcohol, with a compound containing primary and/or secondary amino groups, which compound contains at least 3 hydrogen atoms bound to amino nitrogen atoms and has a molecular weight of more than 300, and preferably a polyamino polyamide, in a presence of certain amounts of monohydric phenol. It has been found that the use of the above-described amino containing compound in combination with monohydric phenols in the disclosed portions results in a much faster reaction as well as an unexpected improvement in the compatibility of the epoxy resin and the amino containing material. It has also been found that the mixture containing the epoxy resin, the amino containing material and the phenol has good flowing characteristics and can be used to form surface coatings having a fine surface free of imperfections. It has been further found that the resulting infusible insoluble products have excellent properties, such as hardness and flexibility as well as good chemical resistance and can be utilized for many important industrial applications.

It has also been observed that the cured products obtained by the process of the invention have excellent adhesion to glass. This adhesion is such that the finishing or sizing agents normally applied for the adhesion to glass fibers, such as, for example, chlorosilanes, are no longer required. It may be finally observed that the presence of phenolic compound in the reaction mixture does not adversely affect the flexibility and the resistance to water and caustic alkali solutions of the resulting cured products.

As noted above, the amino compounds used in the process of the present invention include those containing primary and/or secondary amino groups, which compounds contain at least 3 hydrogen atoms bound to an amino nitrogen atom and has a molecular weight of more than 300, and preferably more than 500. Examples of these curing agents include polyamino derivatives of long chain fatty acids, adducts of amines and epoxidized oils or alkenes and amino polyamides obtained by reacting polycarboxylic acids with polyamines.

The preferred materials to be employed in the process comprise the polyamino polyamides, and preferably those obtained by reacting a polybasic acid having at least 7 carbon atoms between the acidic groups and an aliphatic polyamine.

Examples of polybasic materials used in making these polyamides include, among others, 1,10-decanedioic acid, 1,2 - dodecadienedioic acid, 1,20 - eicasodienedioic acid, 1,14-tetradecanedioic acid, 1,18-octadecanedioic acid and dimerized and trimerized fatty acids obtained by heat polymerizing drying oil fatty acids under known conditions. Normally, this is effected by utilizing the lower aliphatic esters of the drying oil esters so as to prevent decarboxylation during the heating period. During the heating period dimers and trimers are usually obtained. This process is illustrated in the "Industrial and Engineering Chemistry," vol. 38, page 1139 (1946). The structures of the production so obtained are believed to be those given in "Industrial and Engineering Chemistry," vol. 33, page 89 (1941). Numerous drying oil acids can be used in preparing the polymerized acids, but the preferred acids are those containing from 16 to 24 carbon atoms, such as, for example, linoleic acid, linolenic acid, eleostearic acid, and licannic acid.

The aliphatic polyamines used in preparing the polyamides may be any di-, tri- or tetramines, such as, for example, ethylene diamine, diethylene triamine, triethylene tetramine, tetraethylene pentamine, 1,4-diaminebutane, 1,3-diaminebutane, hexamethylene diamine, 3-(N-isopropylamino)propylamine, and the like.

Especially preferred polyamides are those derived from the aliphatic polyamides containing no more than 12 carbon atoms and polymeric fatty acids obtained by dimerizing and trimerizing ethylenically unsaturated fatty acids containing up to 24 carbon atoms. These preferred polyamides have a viscosity between 10 to 750 poises at 40° C., and preferably 20 to 250 poises at 40° C. Preferred polyamides also have amine values of 50 to 450.

As noted, the polyamino polyamides used in the process of the invention possess at least 3 hydrogen attached to amino nitrogen atoms. Such products are obtained by controlling the proportion of reactants, such as, for example, by using an excess of the polyamine reactant. A process for making such polyamides is illustrated in U.S. 2,450,940 and U.S. 2,695,908 and so much of the disclosure of these patents relating to the preparation of the polyamides is incorporated herein by reference.

The component to be employed in combination with the above-described amino containing compounds include the monohydric phenols, such as, for example, phenol, p-chlorophenol, tertiarybutylphenol, p-amylphenol, p-octadecylphenol, and the like, and mixtures thereof.

The polyepoxides to be used in preparing the compositions of the invention comprise those materials possessing more than one vicinal epoxy group, i.e., more than one $$-\overset{\overset{O}{\diagup\;\diagdown}}{C\!-\!\!-\!\!-\!C}-$$

group. These compounds may be saturated or unsaturated, aliphatic, cycloaliphatic, aromatic or heterocyclic and may be substituted with substituents, such as chlorine, hydroxyl group, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458, and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, ethyl elaseostearate, octyl 9,12-octadecadienoate, methyl elaeostearate, monoglycerides of tung oil fatty acids, monoglycerides of soybean oil, sunflower, rapeseed, hempseed, sardine, cottonseed oil, and the like.

Another group comprises the diglycidyl esters of dibasic acids such as adipic, pimelic, suberic, azelaic, sebacic, maleic, phthalic, terephthalic, isophthalic and the like.

Another group of the epoxy-containing materials used in the process of the invention includes the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxybutyl) tetrahydrophthalate, di(4,5-epoxydodecyl) maleate, di(2,3-epoxybutyl) tetraphthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl)-1,2,4-butanetricarboxylate, di(5,6-epoxypentadecyl) tetrate, di(4,5-epoxytetradecyl) maleate, di(2,3-epoxybutyl) azelate, di(3,4-epoxybutyl) citrate, di(5,6-epoxyoctyl) cyclohexane-1,3-dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials include epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, didecyl cyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprising the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene styrene copolymers and the like.

The preferred polyepoxides to be employed in the process comprise those having molecular weights below 1200 and preferably below 600. The polyepoxide is preferably liquid so that there is no need to use solvents and/or heat for applying the resin. Very suitable polyepoxides to be used are those derived from dihydric phenols and preferably 2,2-bis(4-hydroxyphenyl)propane or glycidyl and have molecular weights in the range of from 300 to 500 and contain at least 1.6 epoxy groups per molecule.

The curing of the polyepoxides is effected by merely mixing and reacting the above-described polyepoxides with the above-described amino containing compounds and the monohydric phenol in the disclosed proportions. The curing takes place at room temperature but under these conditions the rate is sometimes quite slow and it is desirable to heat the mixture to speed the cure. Preferred temperatures range from about 50° C. to 250° C. and more preferably from about 50 to 150° C.

The ratio of the quantities of the polyepoxides and the amino containing curing agent vary within certain limits. The above-described superior results are obtained when the polyepoxides and the amino containing materials are combined in a weight ratio varying from 90:10 to 10:90, and more particular, from 70:30 to 30:70. A very suitable ratio is 65:35.

The amount of the monohydric phenol to be used depends upon the molecular weight of the compound selected. In general, the amount of the phenol will be below 20% by weight based on the polyepoxide and preferably between 4% and 12% by weight of the polyepoxide.

The amino containing compound, the monohydric phenol and the polyepoxy may be combined in any order. It is generally preferred to add the monohydric phenol to the amino containing curing agent and then combine this mixture with the polyepoxide.

In executing the process of the invention, it is desirable to have the desired combination in a mobile liquid condition. This may be accomplished by employing heat or by the addition of liquid solvents or diluents. The solvents employed may be volatile and escape from the polyepoxide by evaporation before or during cure, such as ketones, as acetone methyl ethyl ketone, methyl isobutyl ketone, or esters, such as ethyl acetate butyl acetate or esters as methyl, ethyl or butyl ether ethylene glycol. To save expense, these solvents may also be used in admixture with aromatic hydrocarbon, such as benzene, toluene, xylene and/or alcohols, such as ethyl alcohol.

It is also highly desirable to use so called reactive diluents, such as liquid compounds containing one or more reactive groups, such as epoxy groups, in the molecule, such as 1,2-butaneoxide, diglycidyl ether, glycidyl ethers of monohydric phenols or monohydric alcohols, such as butyl glycidyl ether, phenol glycidyl ether, propyl glycidyl ethers and the like.

In addition to the above-mentioned components, other substances may, if desired, also be incorporated in the reaction mixture. Examples of such substances include other curing agents as aliphatic amines filters, pigments, dyes, plasticizers and other resins.

The cured products obtained according to the invention are particularly suitable for use as surface coatings. The curing may even be effected at room temperature and when liquid epoxy resins are used the solvents normally employed in the paint industry are unnecessary. The cured products obtained according to the invention are not only suitable for the manufacture of surface coatings, but are very suitable for the manufacture of laminates and as adhesives. If desired, the process according to the invention may also be used in the manufacture of castings and potting compositions.

To illustrate the manner in which the invention may be carried out, the following examples are given. It is to be understood, however, that the examples are for the purpose of illustration and the invention is not to be regarded as limited to any of the specific materials or conditions recited therein.

EXAMPLE I

A mixture was prepared comprising 100 parts of an epoxy resin further described below, and 54 parts of a fluid polyamide of diethylene triamine and dimerized linoleic acid having a mol wt. of about 760, containing about 4 non-tertiary amino groups and about 6 amino hydrogen and having a viscosity of 80–120 poises at 40° C. The above-mentioned epoxy resin was prepared as follows:

228 grams of 2,2′-bis(4-hydroxyphenyl)propane (1 mol) were dissolved in 925 grams epichlorohydrin (10 mols). The mixture was heated to 150° C. and 168 grams of 50% aqueous sodium hydroxide were slowly added with stirring over a period of 3 hours. During the reaction the water concentration was maintained at a low value by distilling off an azeotropic mixture of water and epichlorohydrin; after separation the epichlorohydrin was returned to the reaction vessel.

After addition of all the caustic alkali solution the excess epichlorohydrin was distilled off, first at normal pressure and then at reduced pressure. The residue was then taken up in 1400 cc. of toluene and the salt formed during reaction filtered off. After removal of the toluene, 325 grams of an epoxy resin were obtained containing an average of 1.9 epoxy groups per molecule and having a molecular weight of approximately 380.

5% by weight of phenyl glycidyl ether were added to the above-mentioned epoxy resin in order to reduce the viscosity.

The quantities of phenol specified in the following table were added to the above-mentioned amino amide. The reaction mixture was applied immediately after mixing (A) as well as after completion of a pre-condensation (B) carried out for 30 minutes at room temperature. The curing was effected without heating, viz. at room temperature. The results are shown in Table I below.

*Table I*

| Quantity of phenol added in parts by weight | Hardness (measured with a Persoz pendulum) after 1 day | | Hardness (measured with a Persoz pendulum) after 4 days | Hardness (measured with a Persoz pendulum) immediately on application heated to 100° C. for ½ hour |
|---|---|---|---|---|
| 0 | A | 5 | 9 | 98 |
| | B | 12 | 18 | 98 |
| 6 | A | 17 | 30 | 90 |
| | B | 32 | 57 | 101 |
| 12 | A | 24 | 45 | 104 |
| | B | 22 | 46 | 100 |

EXAMPLE II

In the same manner as described in Example I, 0, 4, 8, and 12% of phenol, based on the weight of the epoxy resin, were added to the composition used. After the resultant mixtures had been applied without any preceding pre-condensation, the hardness of the resultant film was found to be 9, 70, 68 and 70, respectively, after 4 days by curing at room temperature. These values show that irrespective of the quantity of phenol used the film was already of a satisfactory hardness after approximately 4 days.

EXAMPLE III

The quantities of phenol mentioned in the following Table II were added (in parts by weight) to the composition described in Example I. Before applying the mixture as a film it was allowed to stand for half an hour, during which period a pre-condensation occurred between the components of the composition.

*Table II*

| Quantity of phenol added | Hardness (measured by a Persoz pendulum) | | | |
|---|---|---|---|---|
| | after 1 day | after 2 days | after 3 days | after 7 days |
| 0 | 4 | 7 | 7 | 9 |
| 4 | 11 | 34 | 73 | 70 |
| 8 | 13 | 40 | 70 | 68 |
| 12 | 41 | 70 | 70 | -------- |

This table again shows that after only approximately 3 days the film had a satisfactory hardness. The effect of the accelerated curing is clearly shown by the hardness obtained after 1 and 2 days.

EXAMPLE IV

A mixture was prepared comprising 70 parts by weight of the amino amide described in Example I, 130 parts by weight of the epoxy resin also described in Example I, and 13 parts by weight of phenol. In the following Table III the course of the temperature of this mixture is compared with that of a similar mixture which, however, contained no phenol.

*Table III*

| | | | | | | |
|---|---|---|---|---|---|---|
| Mixture with phenol: | | | | | | |
| time after mixing in min | 5 | 10 | 30 | 60 | 80 | 90 |
| temp., ° C | 22.6 | 24.5 | 31.5 | 41 | 47 | [a] 48 |
| Mixture without phenol: | | | | | | |
| time after mixing in min | 5 | 10 | 30 | 60 | 80 | 120 |
| temp., ° C | 22.3 | 23.2 | 25.5 | 28 | 28.5 | 30 |

[a] In this case gelling of the mixture occurred.

The mixture without phenol was still not compatible even after 120 minutes, while the mixture containing phenol was completely homogeneously mixed after only 10 minutes (temperature 24.5° C.).

EXAMPLE V

The quantities of phenol specified in the following Table IV were added to the composition described in Example I. The gelling periods in which the various compositions homogenized are reported in the following table.

*Table IV*

| | | | | |
|---|---|---|---|---|
| Quantity of phenol added (in p.b.wt.) | 0 | 4 | 8 | 12 |
| Gelling period | 3.3 | 2.25 | 1.8 | 1.3 |
| Time required for the composition to homogenize (in min.) | 40 | 16 | 6 | 0 |

The table shows clearly that an increased reactivity and an improved compatibility is obtained by the addition of phenol.

EXAMPLE VI 32 parts by weight of Synolide 5013 (polyamino derivative of a long-chained ester having an amine value of 358 and produced by Cray Valley Products Ltd., U.K.) and, if desired, a small quantity of phenol (6.8 parts by weight) were added to 68 parts by weight of the epoxy resin described in Example I.

In the absence of phenol sticky films with serious surface imperfections were obtained even after a prolonged curing period. In the presence of phenol a rapid curing was observed, the resultant films having a fine, smooth surface.

EXAMPLE VII

Examples I and II are repeated with the exception that the epoxy resin employed is diglycidyl ether of resorcinol, polyglycidyl ether of glycerol and triglycidyl ether of 1,2-4-trihydroxybenzene. Related results are obtained in each cure.

EXAMPLE VIII

Examples I and II are repeated with the exception that the epoxy resin is as follows: epoxidized tetrahydrobenzyl tetrahydrobenzoate, epoxidized dicrotyl phthalate, epoxidized 2,2-(3-cyclohexenyl)propane and epoxidized polybutadiene. Related results are obtained.

EXAMPLE IX

Examples I, II and VIII are repeated with the exception that the phenol is one of the following: p-chlorophenol and p-tertiarybutyl phenol. Related results are obtained.

We claim as our invention:

1. A process for curing polyepoxides to form resinified infusible insoluble products which comprises mixing and reacting a polyamino polyamide prepared from a polybasic acid and aliphatic polyamine, said polyamino polyamide containing amino nitrogen atoms having attached to at least 2 of such nitrogen atoms from 1 to 2 hydrogen atoms and having a total of at least 3 amino hydrogen atoms and a molecular weight of at least 300, with a polyepoxide having more than one vic-epoxy group in the presence of 4% to 20% by weight of polyepoxide of a monohydric phenol.

2. A process as in claim 1 wherein the polyamino polyamide is a reaction product of a dimerized unsaturated fatty acid and an aliphatic polyamine.

3. A process as in claim 1 wherein the monohydric phenol is phenol.

4. A process as in claim 1 wherein the polyepoxide and the amino polyamide are combined in a weight ratio varying from 90:10 to 10:90.

5. A process as in claim 1 wherein the polyepoxide is a glycidyl polyether of a polyhydric compound of the group consisting of polyhydric phenols and polyhydric alcohols.

6. A process as in claim 1 wherein the polyepoxide is a glycidyl polyether of a polyhydric phenol having a molecular weight in a range of from 200 to 500 and containing at least 1.6 epoxy groups per molecule.

7. A process as in claim 1 wherein a liquid reaction diluent containing from 1 to 2 epoxy groups is contained in the reaction mixture.

8. A process for preparing cured polyepoxides which comprises heating at a temperature between 50° C. and 250° C., a liquid glycidyl polyether of a polyhydric phenol having more than one vic-epoxy group, a polyamino polyamide comprising the reaction product of a polymerized unsaturated fatty acid and diethylene triamine and 4% to 20% by weight of glycidyl polyether of phenol.

9. A composition which is capable of being converted to an insoluble infusible product comprising a mixture of (1) a polyepoxide having more than one vic-epoxy group, (2) a polyamino polyamide prepared from a polybasic acid and aliphatic polyamine, said polyamino polyamide containing amino nitrogen atoms having attached to each at least 2 of such nitrogen atoms from 1 to 2 hydrogen atoms and having a total of at least 3 amino hydrogen atoms and a molecular weight of at least 300, and (3) 4% to 20% by weight of polyepoxide of monohydric phenol.

10. A composition comprising a mixture of (1) a glycidyl polyether of a polyhydric phenol, (2) a polyamino polyamide comprising the reaction product of a polymerized unsaturated polyacid and an aliphatic polyamine, and (3) 4% to 20% by weight of glycidyl polyether of from 4% to 20% by weight of the glycidyl polyether of a monohydric phenol.

11. A composition comprising a mixture of (1) a glycidyl polyether of a polyhydric phenol having more than one vic-epoxy group, (2) a polyamino polyamide comprising a reaction product of polymerized linoleic acid and diethylene triamine, and (3) phenol, with glycidyl polyether and the polyamino polyamide being combined in a weight ratio of 30:70 to 70:30, and the phenol being employed in an amount varying from 4 to 12% by weight of the glycidyl ether.

References Cited in the file of this patent

UNITED STATES PATENTS

| | | |
|---|---|---|
| 2,510,885 | Greenlee | June 6, 1950 |
| 2,705,223 | Renfrew et al. | Mar. 29, 1955 |
| 2,844,552 | Glaser | July 22, 1958 |
| 2,890,184 | Foerster | June 9, 1959 |
| 2,947,726 | Belanger | Aug. 2, 1960 |